United States Patent
Crasnianski et al.

(10) Patent No.: US 6,707,531 B2
(45) Date of Patent: Mar. 16, 2004

(54) AUTOMATIC SELF-SERVICE INSTALLATION FOR PRINTING PHOTOGRAPHS STORED IN DIGITAL FORM

(75) Inventors: Serge Crasnianski, London (GB); Franck Benis, Saint Paul de Varces (FR)

(73) Assignee: KIS, Echirolles (FR)

( * ) Notice: Subject to any disclaimer, the term of this patent is extended or adjusted under 35 U.S.C. 154(b) by 11 days.

(21) Appl. No.: 10/342,050

(22) Filed: Jan. 14, 2003

(65) Prior Publication Data

US 2003/0128343 A1 Jul. 10, 2003

Related U.S. Application Data

(63) Continuation of application No. PCT/FR01/02260, filed on Jul. 12, 2001.

(30) Foreign Application Priority Data

Jul. 17, 2000 (FR) .............................................. 00 09348

(51) Int. Cl.⁷ .......................... G03B 27/52; G03B 15/00
(52) U.S. Cl. ................... 355/49; 355/41; 396/2
(58) Field of Search .............................. 355/40–41, 67; 396/2, 429; 348/207.1

(56) References Cited

U.S. PATENT DOCUMENTS

| | | | |
|---|---|---|---|
| 4,864,410 A | 9/1989 | Andrews et al. ............ 358/443 |
| 5,477,353 A | 12/1995 | Yamasaki ................... 358/487 |
| 5,577,179 A * | 11/1996 | Blank ......................... 395/135 |
| 5,664,255 A * | 9/1997 | Wen ............................ 396/627 |
| 5,936,709 A | 8/1999 | Yamamoto ................... 355/40 |
| 6,085,195 A * | 7/2000 | Hoyt et al. .................... 707/10 |
| 6,141,482 A * | 10/2000 | Massarksy ................... 386/46 |
| 6,341,008 B1 * | 1/2002 | Kraft ............................ 355/67 |
| 6,453,361 B1 * | 9/2002 | Morris ....................... 709/250 |
| 6,480,673 B2 * | 11/2002 | Liebenow ..................... 396/2 |

FOREIGN PATENT DOCUMENTS

FR 2 753 548 9/1998

* cited by examiner

Primary Examiner—Hung Henry Nguyen
(74) Attorney, Agent, or Firm—Heslin Rothenberg Farley & Mesiti P.C.

(57) ABSTRACT

An automatic self-service installation for printing photographs stored in digital form includes a digital medium reader for reading and retrieving digital data from stored image(s) which a user wishes to restore on a paper print. A central processing unit manages the installation and permits interaction with a user. An interacting device, actuatable by the user allows user selection of image(s) within the digital medium for printing, and production of the image(s) on paper medium. An exposure system for the selected image (s) is associated with a facility for storing and moving a photosensitive paper. A chemical treatment unit includes developing baths and a facility for automatic transfer of developed photosensitive paper into the baths. The installation also includes a facility for drying paper print(s) obtained after printing and a receptacle for storing and permitting removal of the produced print(s).

12 Claims, 4 Drawing Sheets

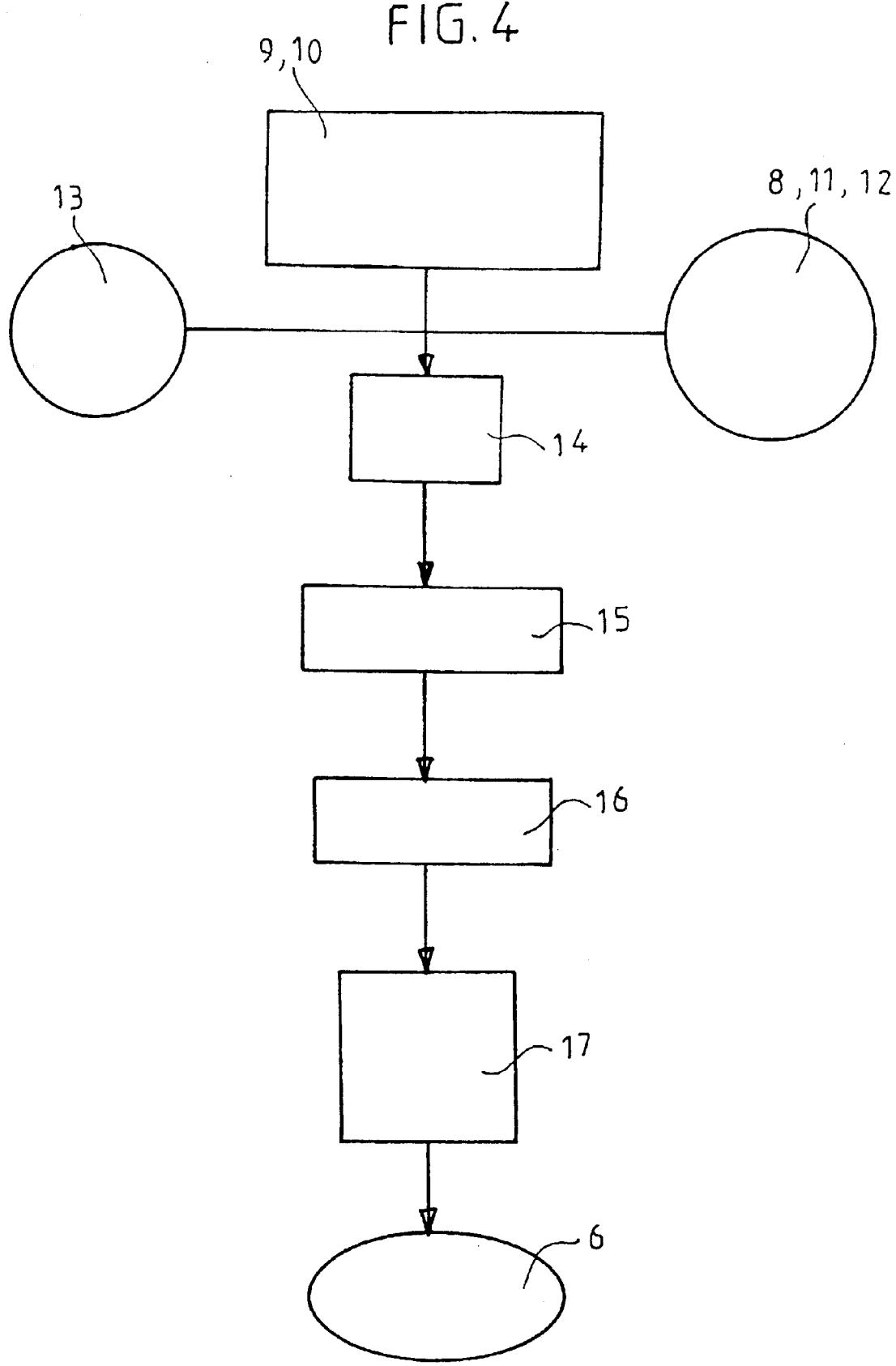

AUTOMATIC SELF-SERVICE INSTALLATION FOR PRINTING PHOTOGRAPHS STORED IN DIGITAL FORM

CROSS REFERENCE TO RELATED APPLICATIONS

This application is a continuation of International Patent Application No. PCT/FR01/02260 filed Jul. 12, 2001 and published as Publication No. WO 02/06896 in French on Jan. 24, 2002, and claims priority from French national application no. 00.09348 filed Jul. 17, 2000 (the contents of these applications being incorporated herein by reference in their entirety).

The invention relates to an automatic installation, operating in particular in self-service mode, intended to allow the production of prints of photographs directly by the consumer or the end user, said photographs being stored in digital form, in particular on digital cards arising from digital photographic apparatuses. The expression printing of photographs is understood within the meaning of the invention to describe the production of snaps obtained according to the silver process, also dubbed the "wet process".

The concept dubbed "API" standing for "Advanced Photographic Image" implements the principle of the digital storage of the images acquired. It has developed continuously since its inception. According to this concept, the snaps are stored in digital form, within a diskette, card, disc, and generally any digital medium, and no longer in an analogue manner on a sensitive negative film, which has to be developed.

The corresponding obtaining of the prints can be performed either by means of a thermal printer, the digital signals then being transmitted, possibly after digital reprocessing, to a thermal printer furnished with a "driver" or suitable operating software, or are restored in a traditional manner on photosensitive paper after development or exposure, according to a well-known silver process.

Under this assumption, the digital images are exposed within an exposure system according to several known methods, by means of various components for the displaying of the image.

Among them may be mentioned:

point-by-point exposure, implementing a laser scan;

exposure per row of aligned points: this technology calls upon for example the implementation of fiber optic cathode ray tubes, but can also be implemented by means of DMD (Digital Micro Mirrors) systems in linear mode, as developed by TEXAS INSTRUMENTS;

finally, exposure can be carried out by means of a liquid crystal screen LCD.

The object of the invention is therefore to propose an automatic installation such as this which is able, in particular in respect of the consumer of such an API concept, to obtain in a relatively short time prints as desired of the photos of his choice, possibly reworked or even reformatted, and moreover at a competitive cost.

Accordingly, this installation comprises:

at least one reader of the digital medium on which the digital photos to be printed are stored, which reader is intended to read and to extract the digital data corresponding to the stored image or images which the user wishes to restore on a paper print;

a central processing unit, intended on the one hand, to manage the operation of the installation, and on the other hand, to cater for interaction with the user;

a facility for interaction between the central processing unit and the user, capable of being actuated by the latter, and intended to allow the latter, on the one hand to select within the digital medium inserted into the reader, the image or images of which he wishes to obtain a paper print, and, on the other hand, to carry out a possible reprocessing or even a reformatting of the said image or images then to bring about its (their) production on paper medium;

an exposure system for the selected digital image or images, which is associated with a facility for storing and for moving a photosensitive paper;

a chemical treatment unit, consisting of a plurality of juxtaposed baths, and furnished with a facility for automatic transfer of the developed photosensitive paper into the various baths;

a facility for drying the snap or snaps thus obtained after printing;

finally a receptacle for storing and for removing the snaps produced.

According to a characteristic of the invention, the installation furthermore comprises a payment or prepayment facility, intended to permit, after remittance by any means of the sum required, the production of the actual print or prints, said payment or prepayment facility being linked directly to the central processing unit.

Additionally and according to another characteristic of the invention, the facility for interaction consists of an assembly made up of a screen, keyboard and mouse or equivalent system of the touch screen type, making it possible to cater for real interaction between the installation and the user, and in particular, to permit the latter to view on said screen, the image or images to be restored, possibly reworked or reformatted.

According to the invention, the exposure system for the image or the images comprises:

a light source, on the optical path of which is positioned a transparent LCD liquid crystal screen, at the level of which are displayed the images to be restored;

a shutter intended to shut off on request the incident light beam emanating from the light source;

a projection and magnifying objective situated between the LCD screen and the photosensitive paper to be developed;

a linear polarizer situated between the light source and the LCD screen.

According to another characteristic of the invention, the installation is connected to the Internet network, so as to allow the conveying by this means of the photos to be printed, and also, the remote monitoring of the maintenance of the installation.

According to another advantageous characteristic of the invention, the installation is furnished with a scanner, linked to the central unit, and suitable for allowing the digitization of analogue photos or data, and as a corollary, their restoration, after possible reprocessing or reformatting, on paper medium.

The manner in which the invention may be embodied and the advantages stemming therefrom will emerge better from the exemplary embodiment which follows, given by way of nonlimiting indication in support of the appended figures.

FIG. 4 is a diagrammatic representation of the exposure system in accordance with the invention.

Figure 1:
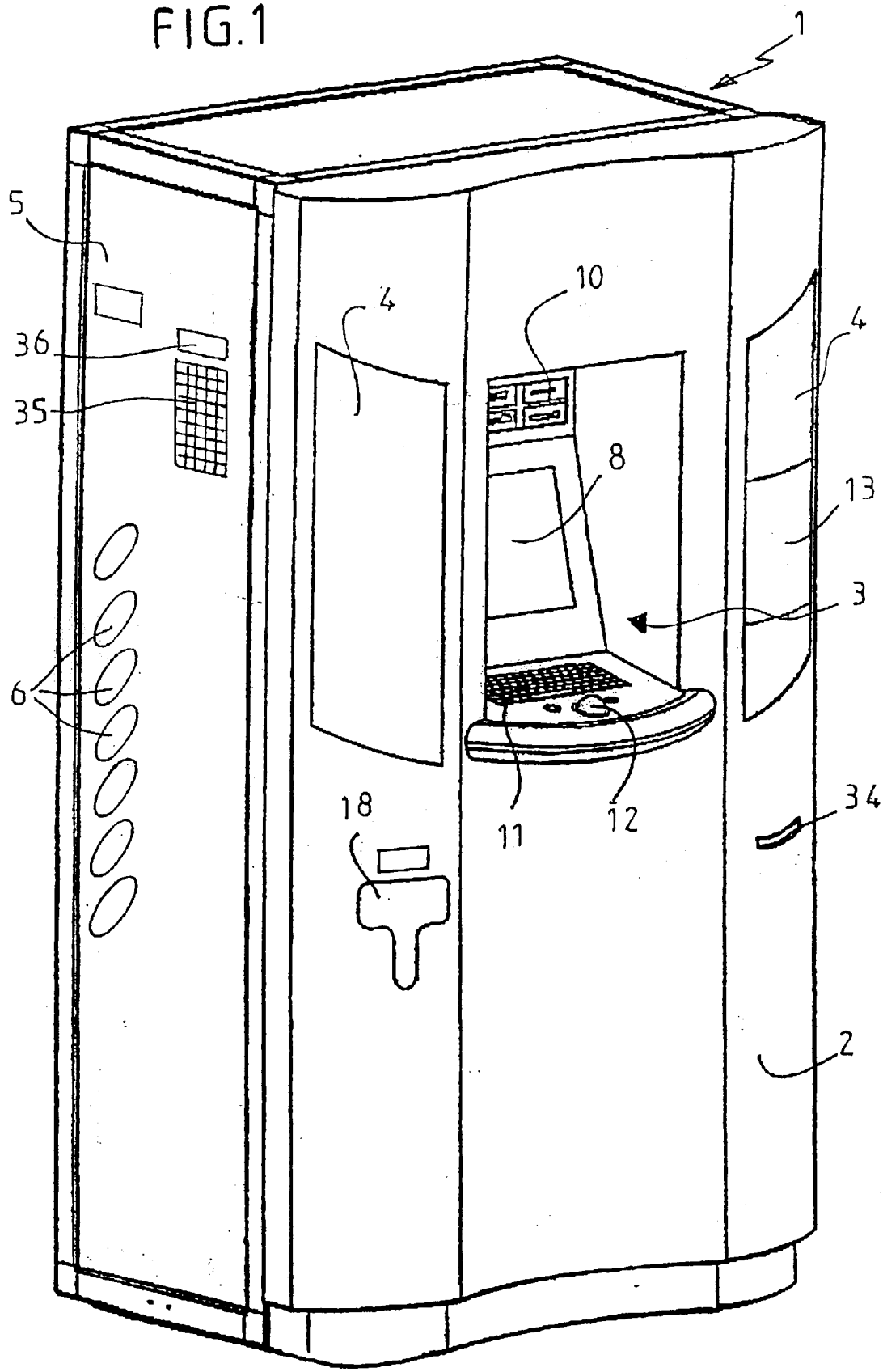
FIG. 1 is a perspective diagrammatic representation of the installation in accordance with the invention.

Hence, represented in FIG. 1 is a perspective diagrammatic representation of an automatic self-service installation in accordance with the invention. The latter takes the form, for example of a station (1), powered electrically from the domestic mains supply.

This station (1) exhibits a main face (2), on which the various interactive elements available to a potential user and necessary for carrying out the desired operation appear.

Access to the interior of the station (1) is made possible by means of a side door (5), thus allowing the maintenance department to carry out its job or jobs, in particular the periodic changing of the chemistry of the silver treatment baths, which are described in greater detail hereinbelow.

The installation as a whole is advantageously vandal-proofed.

The main face (2) basically comprises a console (3), integrating the various means of interaction between the installation and the user, and which are described in greater detail hereinbelow.

Either side of this console panels (4) have been represented, intended to serve as advertising medium, or as information elements relating to the operation or to the purpose of the installation in question.

Additionally, within one of the panels (4), there is a payment or prepayment facility (13), typically consisting of a bank card reader, which can also be replaced with a coin feed or a ticket feed. Under this facility there are under the reference (18), slots acting as a receptacle for blank digital cards, which are able to be set up at an APS type photographic apparatus, and which are stored within a dispenser (not represented), and which can be acquired by the consumer or the user, of course, after tendering the corresponding sum to the payment facility (13), or included in the price of the printing of the photos. These digital cards are stored inside the station (1).

Within one of the panels (4) there is also the slot (34) for inserting an analogue medium at the level of a scanner, linked to the central unit (14), and intended, as already specified, to allow the digitizing of analogue photos or data supplied by the user.

The side face (5) receives a plurality of receptacles (6), represented one underneath the other within FIG. 1, and intended to allow the storage and the removal of the snaps produced by the installation. Above these receptacles is advantageously a receptacle (19), to which are conveyed sleeves for storing the prints, said sleeves being stored inside the station (1) within a dispenser (not represented).

Figure 2:
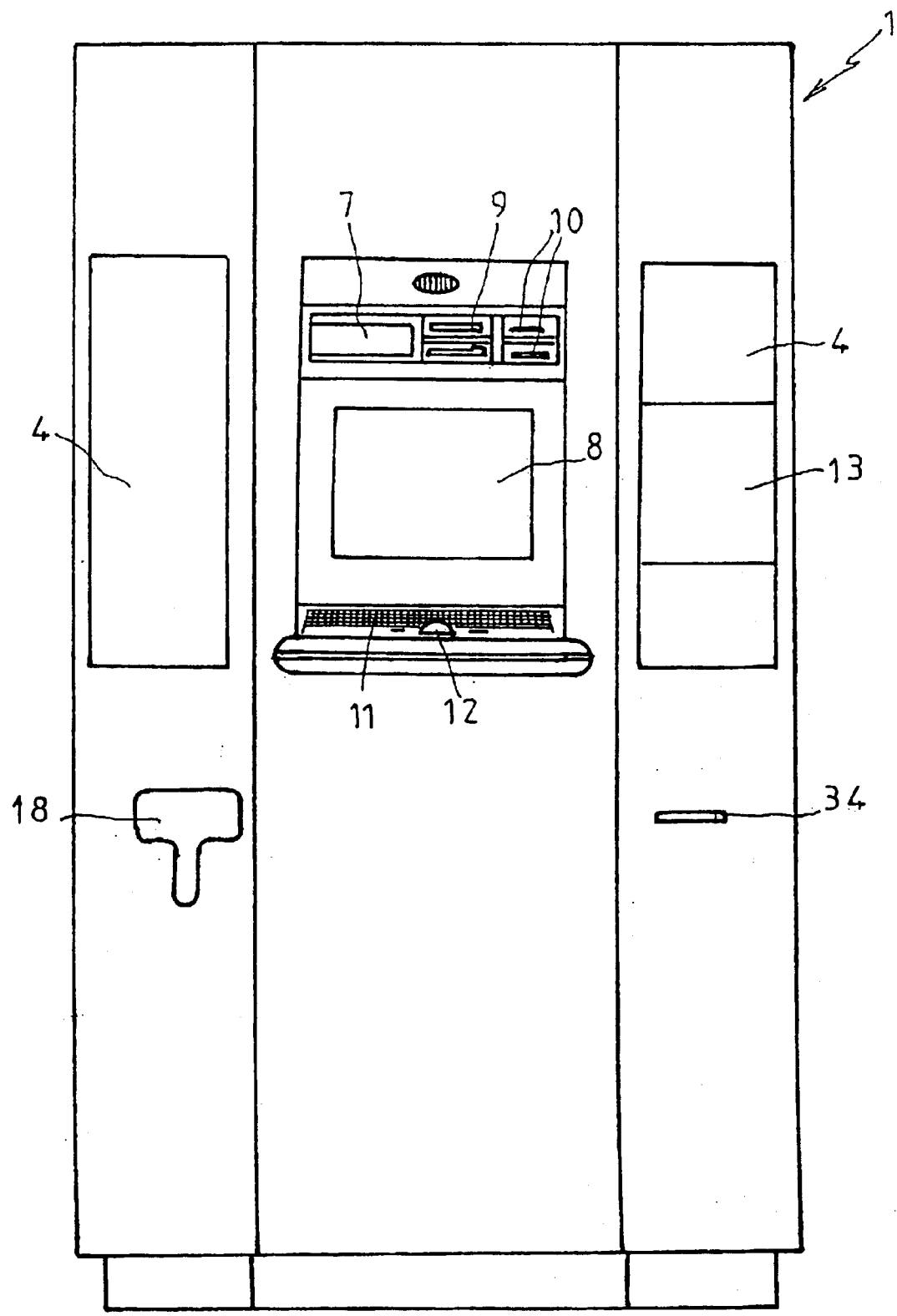
FIG. 2 is an end-on diagrammatic view of the installation.

The purpose of the console (3) as already stated is the interaction of the installation with a user. It is described further in conjunction with FIG. 2. This console basically comprises a screen (8) on which appear first of all the instructions and the directions for operating the installation in question. Additionally, this screen (8) is also intended to allow the viewing of the images stored on the user's digital medium, with a view to allowing the selecting of the image or images desired by the user, as well as, as the case may be, its reprocessing. It furthermore makes it possible to view, as the case may be, the restoration of the image acquired by the scanner.

This screen (8) is associated with a keyboard (11), and a mouse or equivalent (12), intended to allow the selecting of the various options offered in the menus which can scroll on the screen (8), such as in particular the choice of language, and other indications, which are traditional for a self-service installation.

This assembly made up of keyboard (8), screen (11), mouse (12) could be replaced with a touch screen, fulfilling, in a known manner, the same functions.

This interactive facility is furthermore supplemented with a loudspeaker (7) which, as the case may be, complements the visual information appearing on the screen (8) with spoken messages.

Above the screen (8) have been depicted under the references (9) and (10) readers of digital cards or of discs of the CD-Rom, CD Rom R type, 3.5 inch or 5¼ inch floppy diskettes, compact flashes, smart media, etc., and in general, all the digital media associated with photographic apparatuses compatible with the API technology. These readers are intended, in a known manner, to have access to the digital data, and in particular to the images, stored within these digital media.

These various facilities are linked to the central processing unit (14), integrated within the station.

Figure 3:
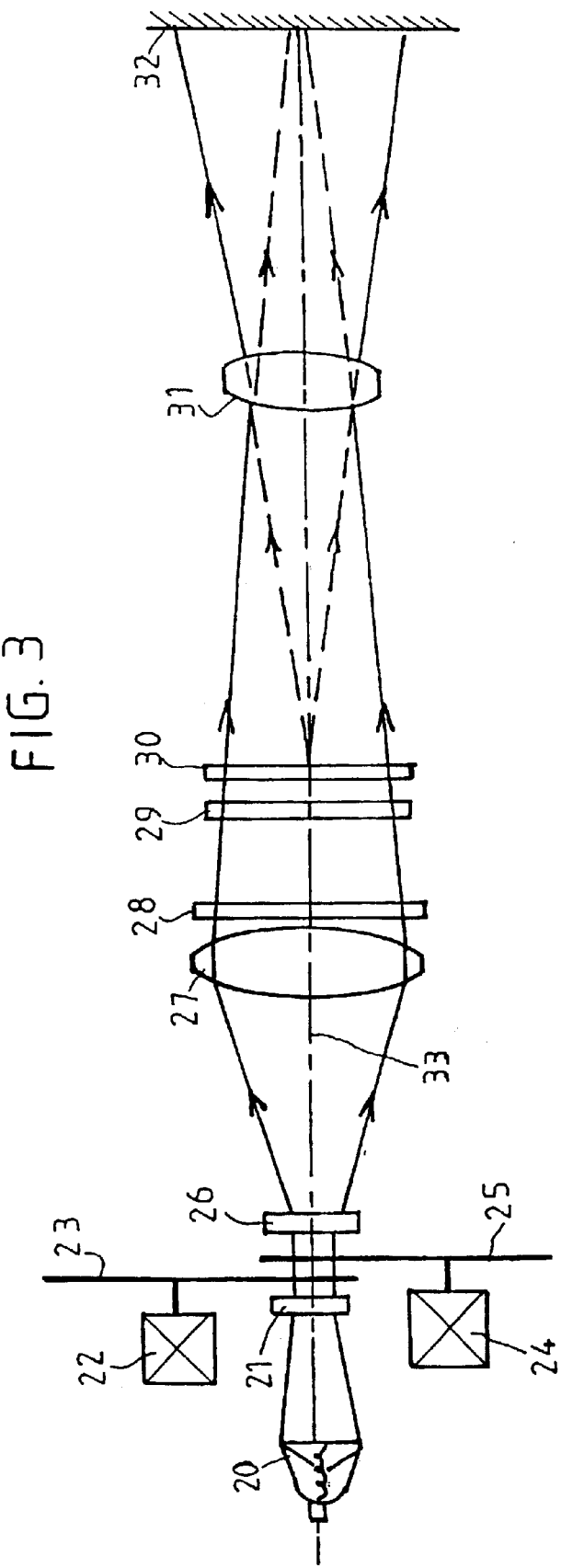
FIG. 3 is a schematic view of various elements interacting within the installation.

The manner of operation of the installation will now be described in greater detail in conjunction with the schematic diagram of FIG. 3.

First of all, it should be specified that the operation of the installation is managed by a central processing unit (14), typically consisting of a microcomputer of a conventional type, integrated inside the station (1). Apart from the management of the operation of the installation, this processing unit (14) caters for interaction with the payment or prepayment means (13). Accordingly, it brings about for example the scrolling of welcome messages on the screen (8), or on the loudspeaker (7), inviting the user to actuate the mouse or any one of the keys of the keyboard (11), that is to say until effective activation of the installation by the user, this activation giving rise to the issuing of a message bidding the user to tender the prescribed sum. When the latter is actually tendered at the level of the payment means (13), the central processing unit (14) brings about the implementation of the successive steps and, in particular bids the user to insert at the level of the appropriate reader (9, 10), the medium which he possesses, with a view to its reading, to the selecting of the desired image or images, to its/their possible reprocessing, and finally, to its/their printing.

Stated otherwise, the central processing unit (14) also caters for interaction with the screen/keyboard/mouse interactive facilities, so as thus to allow the user on the one hand, to select the view or views whose print he wishes to obtain, and which are stored at the level of the medium which he inserts into the reader (9, 10), on the other hand, possibly to bring about a reprocessing of the image, doing so by means of one or more items of software integrated at the level of said central unit, or even to proceed to a reformatting of the snaps. This reprocessing can consist of a reframing, or even of the production of photos of small dimensions, commonly dubbed "wallet size".

The images in question therefore appear systematically on the screen (8), in real mode, so as to receive the user's approval, before being printed, this approval being manifested by actuation of one of the keys of the keyboard (11) or by that of the mouse (12).

The central processing unit (14) is furthermore associated with several electronic cards (15), in particular intended for transforming the digital signals corresponding to the image (s) selected by the user, and possibly reprocessed, appearing on the screen (8), into analogue signals, themselves intended to be displayed at the level of the exposure system (16). Moreover, these cards make it possible to cater for the operation of the various facilities by the central unit (14).

The exposure system will be described in greater detail in conjunction with FIG. 4.

Hence, once the digital image has been selected by the user, and transformed into analogue signals, it is conveyed to the exposure system (16), with a view to its exposure, so as to develop a photosensitive paper, stored within the installation, in particular in the form of reels, said reels advantageously being motorized.

In parallel, this exposure system (16) is integrated within an enclosure, part of which is sealed to light so as to form a dark chamber. This dark chamber part is therefore intended to allow the development of a photosensitive paper.

After development for a sufficient duration, the photosensitive paper is dealt with by an automatic system, which conveys said developed paper to the chemical treatment baths by successive automatic passage, first of all through the developer, a bleach fix, then the various successive washing baths, and in particular three, for example, before being dried, in particular by way of a blower in a drying enclosure (not represented).

The chemical treatment baths employed are treatment baths operating at relatively high temperature, typically 40° C., allowing accelerated chemical treatment, of a duration of around 1 min 40 s.

Finally, said print is conveyed to the receptacle (6), from where it can be removed by the user. The manner of operation of such a printing installation proper is described in greater detail in the document EP-A-0 296 080, the content of which is incorporated into the present description by reference.

The exposure system will now be described in greater detail, in conjunction with FIG. 3. It conventionally comprises the following elements:
- a light source (2), typically consisting of a 250 watt 24 volt halogen lamp;
- a heat-absorbing filter (21);
- a shutter turret (23), rotated by means of an electric motor (22) and intended to shut off the incident beam emitted by the source (20) and also catering, if necessary, for the diaphragm function;
- a filter-holder (25), also rotated by means of an electric motor (24) and holding three filters respectively red, green and blue, with a view to the production of color proofs by additive synthesis;
- a diffuser (26), intended to broaden the incident beam emanating from the light source (20) and to make it more uniform;
- a condenser (27), intended to direct the incident beam, after diffusion, to a projection objective (31);
- a compensater or corrector (28) of the uniformity of lighting, typically consisting of an opaline;
- a liquid crystal LCD screen (30), consisting for example of a panel marketed by the company SONY under the reference LCX017AL, comprising a matrix of 1024× 728 active pixels, and at the level of which the image stored in digital form selected by the user is intended to be reproduced, said LCD screen being preceded by a linear polarizer (29), necessary for the operation of said LCD screen, and intended to polarize the light arising from the incident beam along a specified direction.

The operation of this exposure system can furthermore be optimized by interposing on the optical axis (33), between the LCD screen (30) and the projection and magnifying objective (31), a plate (not represented) with parallel faces, of constant thickness of between 1 and 2 mm, centered at the level of said optical axis, rotatable, and inclined by an angle of 1 to 2° with respect to the plane perpendicular to the axis of rotation of the plate and in this instance, to the optical axis (33). This plate is intended to optimize the quality of restoration of the photographs stored in digital mode. Such an installation is for example described in greater detail in the document EP-A-0 987 875 of the Applicant, the content of which is incorporated into the present description by reference.

In an enhanced version of the invention, the installation can furthermore be connected to the Internet network. In this way, as soon as the consumer has created his account on an appropriate site, it becomes possible for him to convey directly to a station the images to be printed at the level of the station in question.

Moreover, from such a station, it is also possible for him to deliver, again by way of the Internet network, the images stored on a digital card inserted at the level of the appropriate reader (9, 10), the image or images of his choice, of e-mail address of his choice. He can in the same way deliver them to his own address or to the site of his choice.

Finally, if the installation is actually linked to the Internet network, it is also possible for the manager thereof to cater for remote maintenance monitoring.

The print or prints produced are as already stated conveyed to one of the receptacles (6) made on the side face (5). According to an advantageous characteristic of the invention, the restoration of said snap or snaps at the level of the receptacles (6) is performed by means of an order dispenser. Typically, the latter consists of software integrated into the central unit (14) and intended for allocating an order number to each user upon the initiation of the prints, as well as a confidential code. This code is entered into the central unit (14) by means of a keyboard (35), made on the side face (5) and associated with an LCD screen (36), allowing the viewing of the entering of said code by the user, and possibly its correction.

If the code is entered is correct, the desired print or prints are conveyed to one of the receptacles (6), and as a corollary, a sleeve is dispensed at the level of the receptacle (19).

This order dispenser therefore allows the simultaneous management of several prints for several users, the latter not in fact being forced to remain in proximity to the station and to wait for the actual production of said prints.

The great simplicity of use of the installation in accordance with the present invention is appreciated. The latter makes it possible in fact by way of interactive facilities of widespread use, to make possible not only silver photographic printing of high quality from digital images obtained according to the API concept, but also by means of tailored software stored at the memory of the central processing unit (14), to reprocess the images in question.

Moreover, and as already specified, the implementation of several types of paper formats may be envisaged, consequently permitting a reformatting of the snaps in question.

What is claimed is:

1. An automatic self-service installation available to users for printing photographs stored in digital form within a digital medium, comprising:
- at least one reader of the digital medium on which the digital photos to be printed are stored, said reader serving to read and to extract digital data corresponding to a stored image or images which a user wishes to restore on a paper print;
- a central processing unit for managing operation of the installation, and to cater for interaction with the user;
- a facility for interaction between the central processing unit and the user, capable of being actuated by the user, and allowing the user to select within the digital medium inserted into the reader, the image or images of which the user wishes to obtain a paper print, and then to bring about production of said image or images on paper medium;

an exposure system for the selected digital image or images, which is associated with a facility for storing and for moving a photosensitive paper;

a chemical treatment unit comprisisng a plurality of juxtaposed baths, and furnished with a facility for automatic transfer of developed photosensitive paper into the baths;

a facility for drying a paper print or prints thus obtained after printing; and a receptacle for storing and permitting removal of the print or prints produced.

2. The automatic self-service installation for printing photographs as claimed in claim 1, wherein the facility for interaction, further allows a reprocessing, or a reformatting of said image or images selected by the user.

3. The automatic self-service installation for printing photographs as claimed in claim 1 further comprising a payment or prepayment facilty to permit, after remittance by any means of a sum required, production of the print or prints, said payment or prepayment facility being linked directly to the central processing unit.

4. The automatic self-service installation for printing photographs as claimed in claim 1 wherein the facility for interaction comprises an assembly made up of a screen, keyboard and mouse, or of a touch screen, making it possible for interaction between the installation and the user, and in particular, to permit the user to view on said screen, the image or images to be restored, possibly reworked or reformatted, prior to printing.

5. The automatic self-service installation for printing photographs as claimed in claim 1 wherein the exposure system comprises:

a light source, on an optical path on which is positioned a transparent LCD liquid crystal screen for displaying the images to be restored;

a shutter to shut off on request an incident light beam emanating from the light source;

a projection and magnifying objective situated between the LCD screen and the photosensitive paper to be developed; and a linear polarizer situated between the light source and the LCD screen.

6. The automatic self-service installation for printing photographs as claimed in claim 5, wherein the exposure system further comprises a plate with parallel faces which is interposed on the optical path between the LCD screen and the projection and magnifying objective, said plate being of constant thickness of between 1 and 2 mm, and centered on said optical path, and being rotatable, and inclined by an angle of 1 to 2° with respect to a plane perpendicular to an axis of rotation of the plate.

7. The automatic self-service installation for printing photographs as claimed in claim 1, further comprising a scanner, linked to the central processing unit for allowing digitization of analogue photos or data.

8. The automatic self-service installation for printing photographs as claimed in claim 1, further comprising a connection to the Internet network, in order to allow the user:

on the one hand, to convey directly to said installation the images whose printing he wishes to obtain from a defined site;

on the other hand, to deliver from images stored on a digital card inserted into the reader, the image or images of his choice to an e-mail address or to a site of user choice.

9. The automatic self-service installation for printing photographs as claimed in claim 1, further comprising a dispenser of sleeves, which are available within a receptacle and within which the prints produced can be stored, after printing.

10. The automatic self-service installation for printing photographs as claimed in claim 1 integral with an order dispenser, comprising software integrated into the central processing unit, for allocating an order number to each user upon initiation of the prints, as well as a confidential identification code, the code being entered by the user into the central processing unit by means of a keybroad, so as to allow the recovery of user print or prints.

11. The automatic self-service installation for printing photographs as claimed in claim 10, wherein a LCD screen is associated with the keyboard, so as to allow viewing by the user of the entered confidential code, and to bring about, as necessary, by way of the keyboard a correction.

12. The automatic self-service installation for printing photographs as claimed in claim 1, further comprising a dispenser of blank digital cards, said cards being available at receptacle-slots.

* * * * *